(12) United States Patent
Stroud

(10) Patent No.: US 8,410,918 B1
(45) Date of Patent: Apr. 2, 2013

(54) VEHICLE DOOR OPENING INDICATOR SYSTEM

(76) Inventor: John G. Stroud, Arma, KS (US)

( * ) Notice: Subject to any disclaimer, the term of this patent is extended or adjusted under 35 U.S.C. 154(b) by 245 days.

(21) Appl. No.: 12/787,618

(22) Filed: May 26, 2010

(51) Int. Cl.
| | |
|---|---|
| *B60R 25/00* | (2006.01) |
| *B60R 25/04* | (2006.01) |
| *B60R 25/10* | (2006.01) |
| *B60C 23/00* | (2006.01) |
| *B60Q 1/00* | (2006.01) |
| *G10L 19/00* | (2006.01) |
| *H04M 11/04* | (2006.01) |

(52) U.S. Cl. .......... 340/426.28; 340/5.7; 340/425.5; 340/426.36; 340/447; 340/457; 455/404.1; 704/201; 307/10.5

(58) Field of Classification Search .................. None
See application file for complete search history.

(56) References Cited

U.S. PATENT DOCUMENTS

| | | | | |
|---|---|---|---|---|
| 5,831,520 A | * | 11/1998 | Stephan | 340/457 |
| 5,973,412 A | * | 10/1999 | Nantz et al. | 307/10.5 |
| 6,377,173 B1 | * | 4/2002 | Desai | 340/426.36 |
| 6,420,967 B1 | * | 7/2002 | Ghabra et al. | 340/447 |
| 6,525,645 B2 | * | 2/2003 | King et al. | 340/5.7 |
| 7,564,342 B2 | * | 7/2009 | Klein | 340/425.5 |
| 7,683,764 B2 | * | 3/2010 | Kurpinski et al. | 340/426.36 |
| 2006/0178128 A1 | * | 8/2006 | Eaton et al. | 455/404.1 |
| 2009/0281794 A1 | * | 11/2009 | Ben-Haroush et al. | 704/201 |

* cited by examiner

*Primary Examiner* — George Bugg
*Assistant Examiner* — Renee Dorsey

(57) ABSTRACT

A vehicle door opening indicator system comprises a base unit, a remote unit wirelessly communicating with the base unit, an on-board computer, and door opening sensors. The base unit is placed in a vehicle, is powered from a vehicle battery, and comprises a programmable CPU, a memory, a speaker, an input circuit, and an output circuit. The CPU communicates with the remote unit through the input circuit and with the computer through the output circuit. The remote unit, comprising a microphone and a recorder/player, preprograms the CPU with an individualized message. The door opening sensors are connected to the computer, and the preprogrammed individualized message is reproduced through the speaker upon opening the door.

4 Claims, 4 Drawing Sheets

VEHICLE DOOR OPENING INDICATOR SYSTEM

FIELD OF THE INVENTION

The present invention relates to a device indicating that the door of a vehicle is opened and, more particularly, to such devices that are able to play a favorite song or music upon opening the door of a vehicle.

BACKGROUND OF THE INVENTION

Known from U.S. Pat. No. 4,839,749 issued on Jun. 13, 1989, to Eustace Franklin, is a vehicle safety and personal message system primarily designed to be incorporated into a vehicle to provide the driver with a pre-recorded speech message pertaining to either a vehicle safety alert or a personal message. The safety alerts include such events as: door ajar, burglar alarm ON or OFF, speed limit exceeded and a fire/police siren detector. The personalized messages include reminders such as birth dates, anniversaries, meeting date/time and scheduled maintenance periods. All the messages can be recorded in any language and in any local or ethnic jargon and the personal messages may be programmed to occur at anytime within a one-year period. Although the system's primary usage is for vehicles, it can also be adapted for use on many other products that utilize short messages. These products include robotics, ATM machines, telephone answering machines, fire detection devices, toys and numerous other consumer oriented products.

Disclosed in a US patent application 2007/0001824 A1 published on Jan. 4, 2007, and authored by Donna Lee is a vehicle alarm system that can sound in any variety of tones, sounds, sequences, songs, melodies, tunes, and/or any other prerecorded or individually created and/or determined phrases, statements, songs, tunes, tones, etc.

Known from U.S. Pat. No. 6,130,605 issued on Oct. 10, 2000, to Kenneth E. Flick is a vehicle security system includes an audible alarm indicator, and a controller to generate an alarm indication comprising a plurality of distinguishable sound patterns. The sound patterns overlap in time yet are audibly distinguishable from one another to thereby create an illusion of multiple alarms. Accordingly, a would-be thief may be convinced that multiple vehicle alarms have been triggered and, thus, that more than one vehicle owner may be alerted. The vehicle security system may include at least one vehicle security sensor, and the controller is preferably responsive to the sensor to generate the audible alarm indication. The distinguishable sound patterns may be different from one another. In some other embodiments, at least two of the distinguishable sound patterns are the same sound patterns, but which are out of phase with one another to provide the illusion of multiple alarms. Each of the distinguishable sound patterns preferably includes successive repetitive portions. For example, each of the distinguishable sound patterns may include repetitive changes in at least one of frequency and volume.

Yet, a need exists for an indicator system that could play music or transmit a message upon opening a door of a vehicle.

SUMMARY OF THE INVENTION

This goal is attained by providing a vehicle door opening indicator system comprising a base unit, a remote unit adapted to wirelessly communicate with the base unit, a computer, and door opening sensors. The base unit is placed in a vehicle and powered from a vehicle battery. It comprises a programmable CPU, a memory, a speaker, an input circuit, and an interface circuit. The memory, the speaker, the input circuit, and the interface circuit are connected to the CPU communicating with the remote unit through the input circuit and with the computer through the interface circuit.

The base unit can be made in the form of a box comprising connectors to be connected to a vehicle power system, a port connected to the output circuit to communicate with the computer, and means for mounting the box in the vehicle.

The remote unit comprising a microphone and a recorder/player is capable of preprogramming the CPU with an individualized message, the door opening sensors are connected to the computer, which may include a vehicle on-board computer.

The above-identified features of the vehicle door opening indicator system are believed to fulfill the need for an interesting voice message or music that would sound upon opening a vehicle door.

BRIEF DESCRIPTION OF THE DRAWINGS

Other objects, features and advantages of the disclosure will become apparent to one skilled in the art by reading the following specification and subjoined claims and by referencing the following drawings, in which:

DETAILED DESCRIPTION OF THE PREFERRED EMBODIMENT

Figure 1:
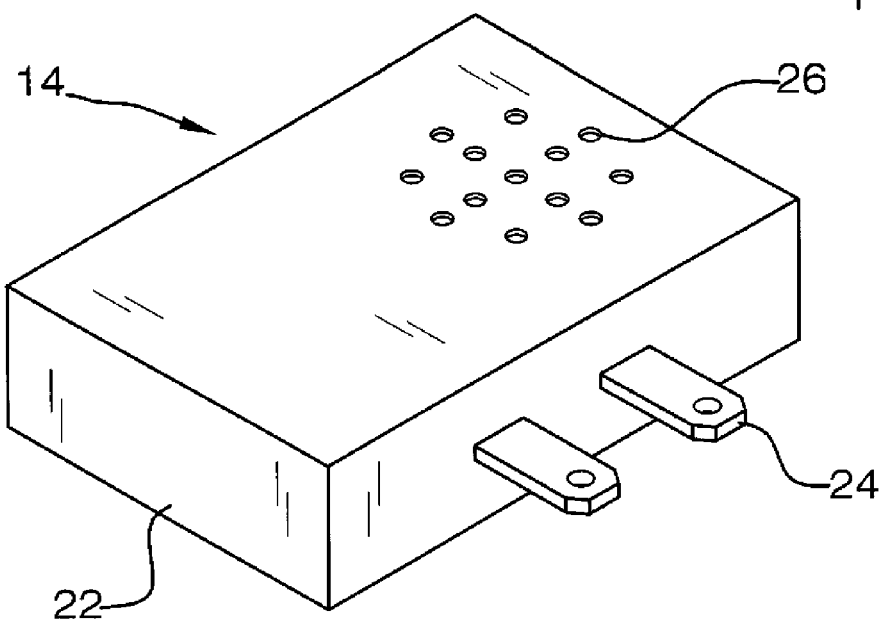
FIG. 1 is a perspective front-top view of a base unit of the system according to the present disclosure.

Before starting a detailed description of the disclosure, mention of the following is in order. When appropriate, like reference numerals and characters may be used to designate identical, corresponding, or similar components in different figure drawings. The following description is merely exemplary in nature and is not intended to limit the described embodiment. As used herein, the word "exemplary" or "illustrative" means "serving as an example, instance, or illustration." So the implementation described hereinafter as "exemplary" or "illustrative" is not necessarily to be construed as preferred or advantageous over other implementations. The implementation described below is an exemplary implementation provided to enable persons skilled in the art to practice the disclosure and is not intended to limit the scope of the claims. As used herein, relative terms such as "top," "bottom," "upper," "lower" are used for descriptive purposes only and not in a limiting sense.

Referring now to the drawings of FIGS. 1-6, a door opening indicator system 10 for a vehicle 12 generally comprises a base unit 14 and a remote unit 16. Also components of the system are a computer 18 and door opening sensors 20.

Figure 2:
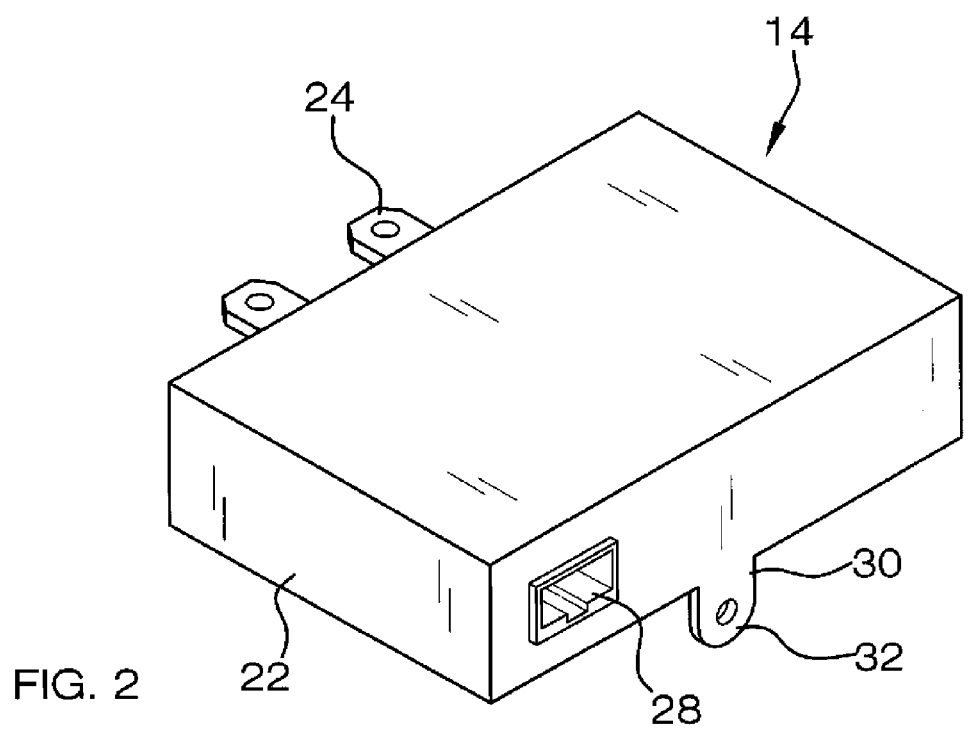
FIG. 2 is a perspective back-bottom view of a base unit of the system according to the present disclosure.
Figure 3:
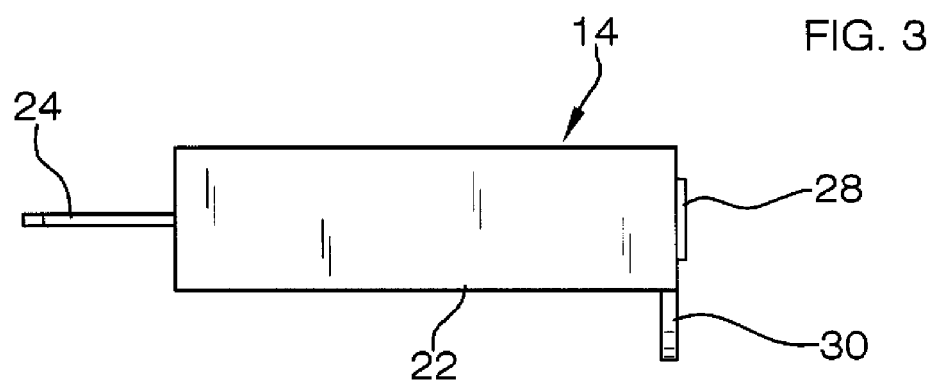
FIG. 3 is a side view of a base unit of the system according to the present disclosure.
Figure 4:
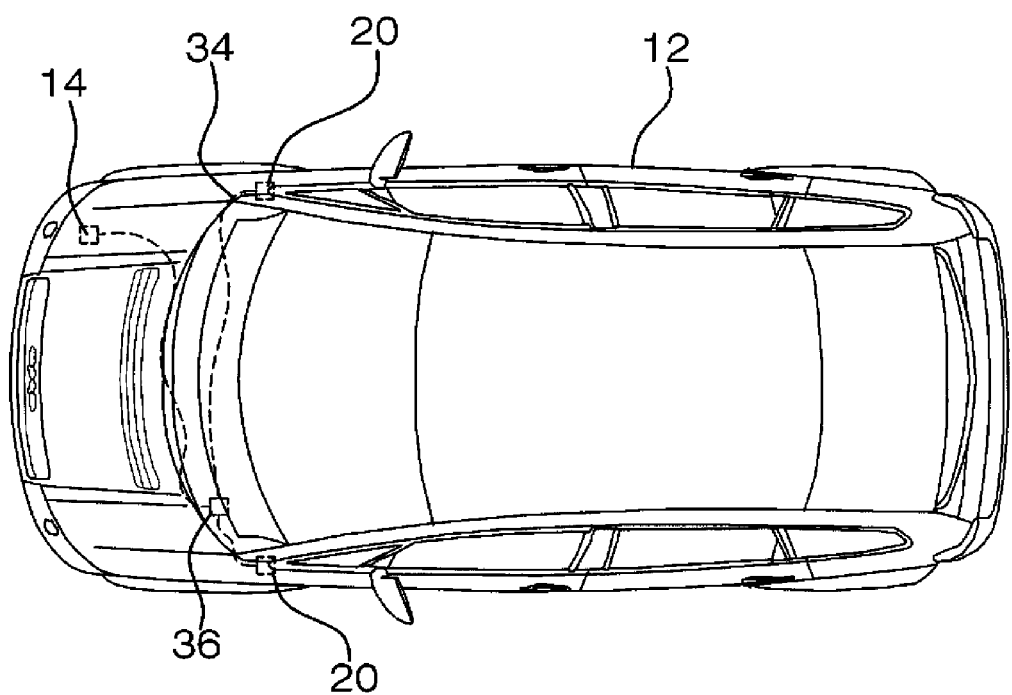
FIG. 4 is a top view of a vehicle equipped with the system according to the present disclosure.
Figure 5:
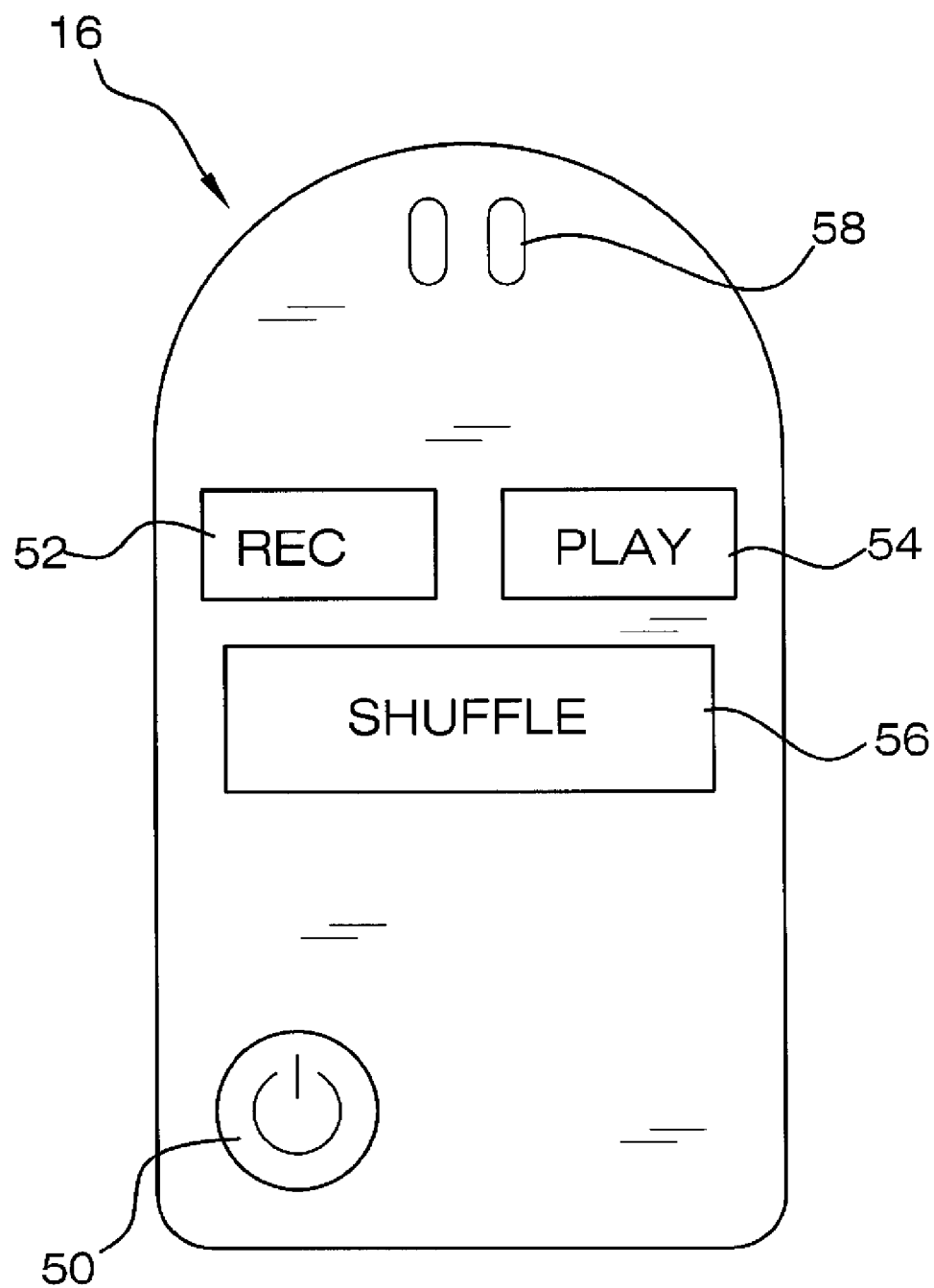
FIG. 5 is a top view of a remote unit of the system according to the present disclosure.
Figure 6:
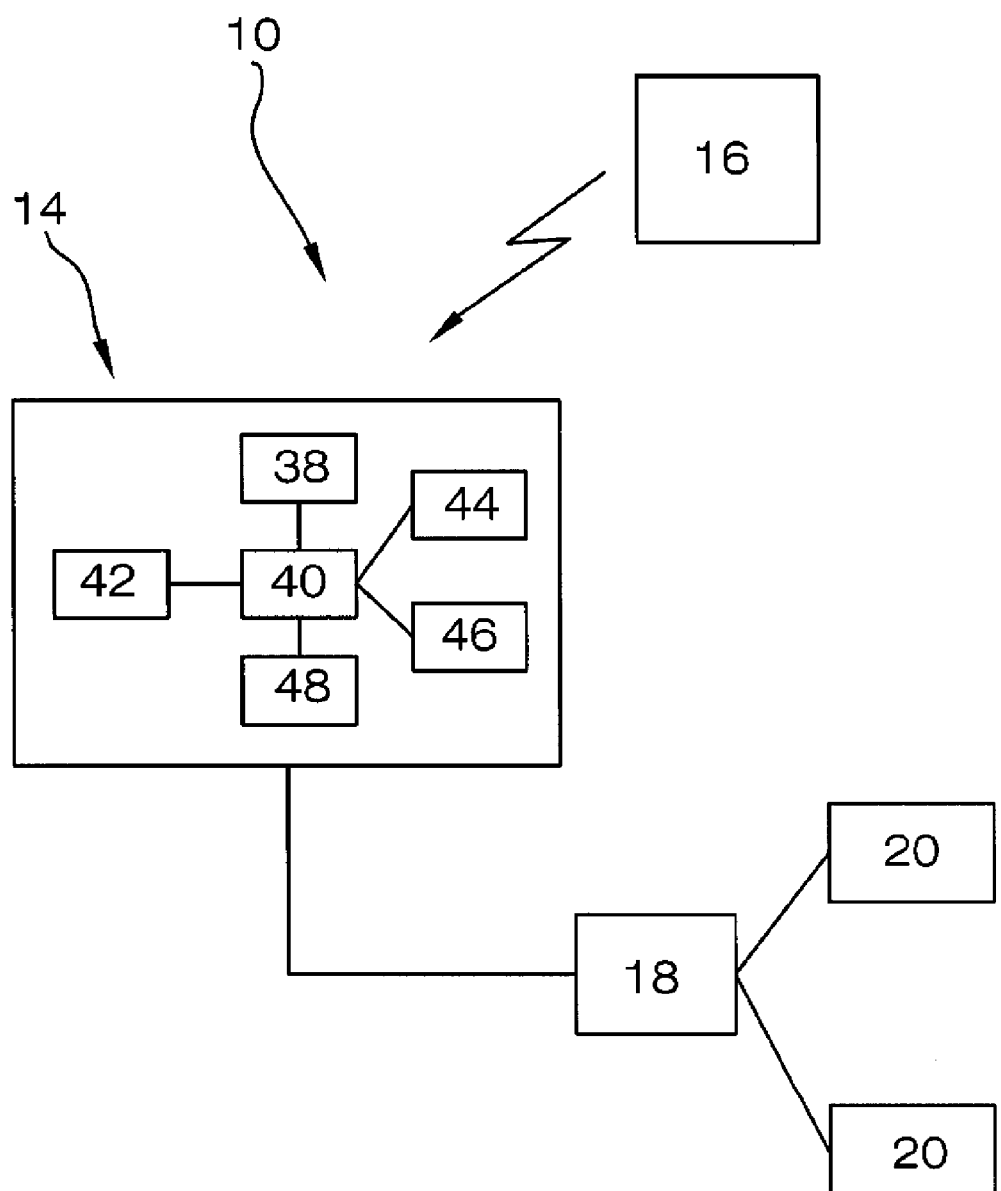
FIG. 6 is a block diagram of the system according to the present disclosure.

Structurally, the base unit 14 makes a box 22. In an exemplary version, the box would be ½ inch tall, ¾ inch long and 1½ inches wide. Practically, the box 22 can be placed instead of a current device under the hood as shown in FIG. 4 or in the glove box. The box 22 is provided with a pair of spaced positive and negative terminals 24 shaped like straight posts for easy plug-in connection of the base unit 14 with a vehicle power system such as battery (not shown). Other structural elements of the box 22 shown in FIGS. 1-3 are speaker holes 26, a PC port 28, and a mounting element 30 with an eye 32. Proper wiring 34 would connect the base unit 14 with a vehicle control unit (on-board computer 36). The computer 18 of the system according to the present disclosure can include the on-board computer 36.

The base unit 14 comprises an input circuit 38 connected to a CPU 40, and a software carrier 42, memory 44, a speaker 46, and an interface circuit 48 all connected to the CPU 40. The remote unit 16 has means (not shown) for recording and reproducing music and/or voice messages and wirelessly transmitting them to the base unit 14. It is provided with buttons "On/Off" 50, "Record" 52, "Play" 54, and "Shuffle" 56, as well as microphone 58.

Preprogramming the base unit 14 from the remote unit 16 can be performed at any time in advance. Music or message transmitted to the base unit go through the input circuit 38 and CPU 40 and would be stored in the memory 44 When the system is in use, opening a door actuates the opening sensor 20 of that door, and the sensor communicates with the computer 18, which controls the base unit through the interface circuit 48. According to the software 42, the CPU 40 extracts the music or message from the memory and directs it to the speaker 46. Instead of hearing a conventional buzzer or dinging noise, the motorist could hear a favorite song or voice message.

It is believed that the system according to the preent disclosure would fulfill the need for an interesting voice message or music that would sound upon opening a vehicle door. The system provides a personalized and customized vehicle and does this in such an interesting manner that was sure to attract the attention of others. The product could be used with virtually any private or commercial vehicle. It would likely prove particularly appealing to serious automotive enthusiasts interested in custom parts and accessories for their vehicles.

The appealing features of the system according to the present disclosure would be its unusual design and automobile customization. Instead of always hearing a dull and lifeless buzzing or dinging noise when a car door was opened, this product would sound a message or sound to be enjoyed by all. This would take some of the monotony and boredom out of original factory equipment to add new life and appeal to the parked car or truck. The product would attract the immediate attention of others to personalize and accessorize the vehicle in a fun and interesting manner.

Those skilled in the art can now appreciate from the foregoing description that the broad teachings of the present disclosure can be implemented in a variety of forms. For example, programming the base unit can be accomplished from a CD or CB player that can be placed in the glove box of a vehicle. Therefore, while the vehicle door opening indicator system of the present disclosure has been described in connection with a particular example thereof, the true scope of the disclosure should not be so limited since other modifications will become apparent to the skilled practitioner upon a study of the drawings, specification and claims that follow.

What is claimed is:

1. A vehicle door opening indicator system comprising:
   a base unit,
   a remote unit adapted to wirelessly communicate with the base unit,
   a computer, and
   door opening sensors,
   the base unit being placed in a vehicle, being powered from a vehicle battery, and comprising a programmable CPU, a memory, a speaker, an input circuit, and an output circuit, the memory, the speaker, the input circuit, and the output circuit being connected to the CPU,
   the CPU communicating with the remote unit through the input circuit and with the computer through the output circuit,
   the remote unit comprising a microphone and a recorder/player, to thereby preprogram the CPU with an individualized message,
   the door opening sensors being connected to the computer, whereby the preprogrammed individualized message is reproduced through the speaker upon opening the door.

2. The vehicle door opening indicator system as claimed in claim 1, wherein the computer includes a vehicle on-board computer.

3. The vehicle door opening indicator system as claimed in claim 1, wherein the base unit includes a box comprising connectors to a vehicle power system, a port to communicate with the computer, the port being connected to the output circuit, and means for mounting the box in the vehicle.

4. A vehicle door opening indicator system comprising:
   a base unit;
   a remote unit adapted to wirelessly communicate with the base unit;
   a computer; and
   door opening sensors;
   the base unit being placed in a vehicle, being powered from a vehicle battery, and comprising a programmable CPU, a memory, a speaker, an input circuit, and an output circuit, the memory, the speaker, the input circuit, and the output circuit being connected to the CPU;
   the CPU communicating with the remote unit through the input circuit and with the computer through the output circuit;
   the base unit including a box comprising connectors to a vehicle power system, a port to communicate with the computer, the port being connected to the output circuit, and means for mounting the box in the vehicle;
   the remote unit comprising a microphone and a recorder/player, to thereby preprogram the CPU with an individualized message;
   the door opening sensors being connected to the computer;
   the computer including a vehicle on-board computer;
   whereby the preprogrammed individualized message is reproduced through the speaker upon opening the door.

\* \* \* \* \*